United States Patent
Meine

(10) Patent No.: US 11,962,137 B2
(45) Date of Patent: Apr. 16, 2024

(54) ELECTRIC JUNCTION BOX MOUNT APPARATUS

(71) Applicant: Unirac Inc., Albuquerque, NM (US)

(72) Inventor: Shawn J. Meine, Phoenix, AZ (US)

(73) Assignee: UNIRAC INC., Albuquerque, NM (US)

( * ) Notice: Subject to any disclaimer, the term of this patent is extended or adjusted under 35 U.S.C. 154(b) by 39 days.

(21) Appl. No.: 17/236,376

(22) Filed: Apr. 21, 2021

(65) Prior Publication Data

US 2021/0328415 A1    Oct. 21, 2021

Related U.S. Application Data

(60) Provisional application No. 63/013,234, filed on Apr. 21, 2020.

(51) Int. Cl.
   H02G 3/08    (2006.01)
   H02G 3/14    (2006.01)

(52) U.S. Cl.
   CPC ............... *H02G 3/088* (2013.01); *H02G 3/14* (2013.01)

(58) Field of Classification Search
   CPC .......... H02G 3/08; H02G 3/081; H02G 3/088; H02G 3/10; H02G 3/12; H02G 3/14; H05K 5/00; H05K 5/02; H05K 5/0217; H05K 5/0247; H05K 5/03; H05K 5/061; H01R 13/46; H01R 13/52; H01R 13/5202; H01R 13/5205
   USPC ....... 174/50, 53, 57, 58, 480, 481, 482, 559; 220/3.2–3.9, 4.02; 248/906; 361/600, 361/601, 641, 679.01
   See application file for complete search history.

(56) References Cited

U.S. PATENT DOCUMENTS

| | | |
|---|---|---|
| D230,348 S | 2/1974 | Sabel |
| 4,025,183 A | 5/1977 | Pundsack |
| 4,026,183 A | 5/1977 | Bart |
| 4,112,693 A | 9/1978 | Collin et al. |
| D263,678 S | 4/1982 | Dewey |
| D263,927 S | 4/1982 | Dewey |
| D263,928 S | 4/1982 | Dewey |
| 4,351,997 A | 9/1982 | Mattisson et al. |
| 4,361,997 A | 12/1982 | DeCaro |
| 4,371,293 A | 2/1983 | Wilcox et al. |

(Continued)

FOREIGN PATENT DOCUMENTS

| | | |
|---|---|---|
| DE | 4416884 A1 | 11/1995 |
| EP | 2006465 A2 | 12/2008 |
| WO | 2022226160 A1 | 10/2022 |

OTHER PUBLICATIONS

AppelRubber, "Seal and Gasket Cross Sections", retrieved from <https://www.applerubber.com/hot-topics-for-engineers/seal-and-gasket-cross-sections>, Feb. 21, 2013, 2 pages.

(Continued)

*Primary Examiner* — Angel R Estrada
(74) *Attorney, Agent, or Firm* — Lee & Hayes P.C.

(57) ABSTRACT

An electrical junction box mount apparatus including a base for mounting to a mounting surface and a lid sized to seal against the base. The base includes a mounting portion having a penetration area. A periphery of the penetration area is circumscribed via a groove formed into a bottom surface of the base such that upon placing the base on a mounting surface, the groove encloses empty space within the groove against the mounting surface.

20 Claims, 7 Drawing Sheets

(56) References Cited

U.S. PATENT DOCUMENTS

| | | |
|---|---|---|
| 4,455,804 A | 6/1984 | Francovitch |
| 4,476,660 A | 10/1984 | Francovitch |
| 4,502,256 A | 3/1985 | Hahn |
| 4,520,606 A | 6/1985 | Francovitch |
| 4,574,551 A | 3/1986 | Giannuzzi |
| 4,619,094 A | 10/1986 | Yang |
| 4,620,402 A | 11/1986 | Beneze |
| 4,624,092 A | 11/1986 | Baginski |
| 4,630,422 A | 12/1986 | Beneze |
| 4,631,433 A | 12/1986 | Stokes |
| 4,631,887 A | 12/1986 | Francovitch |
| 4,658,558 A | 4/1987 | Verble |
| 4,686,808 A | 8/1987 | Triplett |
| 4,715,756 A | 12/1987 | Danico et al. |
| 4,726,164 A | 2/1988 | Reinwall et al. |
| 4,727,699 A | 3/1988 | Sargent |
| 4,744,187 A | 5/1988 | Tripp |
| 4,757,662 A | 7/1988 | Gasser |
| 4,763,456 A | 8/1988 | Giannuzzi |
| 4,787,188 A | 11/1988 | Murphy |
| 4,788,807 A | 12/1988 | Whitman |
| 4,799,845 A | 1/1989 | Hrysko |
| 4,860,513 A | 8/1989 | Whitman |
| 4,860,514 A | 8/1989 | Kelly |
| 4,890,968 A | 1/1990 | Beach et al. |
| 4,943,100 A | 7/1990 | Emberson |
| 4,945,699 A | 8/1990 | Murphy |
| 4,959,938 A | 10/1990 | De Caro |
| 4,989,911 A | 2/1991 | Van Order |
| 4,999,963 A | 3/1991 | Verble |
| 5,018,329 A | 5/1991 | Hasan et al. |
| 5,018,748 A | 5/1991 | Schalle |
| 5,056,853 A | 10/1991 | Van Order |
| 5,069,589 A | 12/1991 | Lemke |
| 5,094,056 A | 3/1992 | Peters |
| 5,100,274 A | 3/1992 | Hasan et al. |
| 5,139,379 A | 8/1992 | Hasan et al. |
| 5,217,339 A | 6/1993 | O'Connor et al. |
| 5,407,313 A | 4/1995 | Bruins et al. |
| 5,419,666 A | 5/1995 | Best |
| 5,557,897 A | 9/1996 | Kranz et al. |
| 5,562,380 A | 10/1996 | Hempfling et al. |
| 5,628,587 A | 5/1997 | Lesslie |
| 5,797,232 A | 8/1998 | Larson |
| 5,803,693 A | 9/1998 | Choiniere et al. |
| 5,908,278 A | 6/1999 | Hasan et al. |
| 5,915,903 A | 6/1999 | Osterle et al. |
| 5,930,969 A | 8/1999 | Mayle et al. |
| 5,934,855 A | 8/1999 | Osterle et al. |
| 6,007,353 A | 12/1999 | Webster |
| 6,035,595 A | 3/2000 | Anderson |
| 6,205,730 B1 | 3/2001 | Hasan et al. |
| 6,233,889 B1 | 5/2001 | Hulsey |
| 6,250,034 B1 | 6/2001 | Hulsey |
| D446,319 S | 8/2001 | Rubenacker |
| 6,282,857 B1 | 9/2001 | Rubenacker |
| D482,597 S | 11/2003 | Brass et al. |
| 6,938,385 B2 | 9/2005 | Lind |
| 6,942,189 B2 | 9/2005 | Capozzi |
| 6,979,777 B2 | 12/2005 | Marcou et al. |
| D547,262 S | 7/2007 | Ullman |
| 7,265,292 B2* | 9/2007 | Greenfield ............ H02G 3/088 |
| | | 174/50 |
| 7,626,118 B1 | 12/2009 | Capozzi |
| 7,645,937 B2* | 1/2010 | Bhosale ................ H02G 3/123 |
| | | 174/50 |
| 7,709,735 B2* | 5/2010 | Vigorito .................. H02G 3/14 |
| | | 174/67 |
| 7,866,099 B2 | 1/2011 | Komamine et al. |
| 7,943,850 B2* | 5/2011 | Leopold ................ H02G 3/088 |
| | | 174/50 |
| 8,013,245 B2* | 9/2011 | Korcz .................... H02G 3/081 |
| | | 174/53 |
| 8,282,108 B2 | 10/2012 | Teng |
| 8,302,363 B1 | 11/2012 | Johnson |
| 8,341,895 B2 | 1/2013 | Schwarze et al. |
| 8,389,858 B2* | 3/2013 | Drane .................... H02G 3/081 |
| | | 174/53 |
| 8,448,407 B1 | 5/2013 | Wiener |
| 8,536,453 B2* | 9/2013 | Qin ........................ H02G 3/185 |
| | | 174/559 |
| 8,796,548 B2* | 8/2014 | Rost ....................... H05K 5/061 |
| | | 174/50 |
| 8,869,471 B2 | 10/2014 | Wildes et al. |
| 8,875,455 B1 | 11/2014 | Yang et al. |
| 8,938,932 B1 | 1/2015 | Wentworth et al. |
| 8,984,819 B1 | 3/2015 | Yang et al. |
| D727,395 S | 4/2015 | Choi et al. |
| 9,080,792 B2 | 7/2015 | Patton et al. |
| 9,134,044 B2 | 9/2015 | Stearns et al. |
| 9,447,988 B2 | 9/2016 | Stearns et al. |
| 9,496,820 B2 | 11/2016 | Seery et al. |
| 9,755,571 B2 | 9/2017 | Almy et al. |
| 9,819,166 B1 | 11/2017 | Capozzi |
| 9,825,581 B2 | 11/2017 | Wildes |
| 9,874,021 B2 | 1/2018 | Hudson et al. |
| 9,893,677 B1 | 2/2018 | Liu |
| 9,906,188 B2 | 2/2018 | Almy et al. |
| 10,079,481 B2* | 9/2018 | Thomas ................ H02G 3/088 |
| 10,148,217 B2 | 12/2018 | Meine |
| 10,171,026 B2 | 1/2019 | Meine |
| D843,932 S | 3/2019 | Sinai et al. |
| 10,297,997 B1 | 5/2019 | Wiese |
| 10,432,136 B2 | 10/2019 | Lu |
| 10,594,121 B2 | 3/2020 | Yang |
| 10,663,195 B2 | 5/2020 | Ash et al. |
| 10,767,684 B1 | 9/2020 | Meine et al. |
| 10,777,981 B1* | 9/2020 | Baldwin ................ H02G 3/088 |
| 10,781,587 B2 | 9/2020 | Meine |
| 10,804,685 B2 | 10/2020 | Yang |
| D909,853 S | 2/2021 | Jasmin |
| 10,916,926 B2* | 2/2021 | Jones ..................... H02G 3/088 |
| 10,982,430 B2 | 4/2021 | Meine |
| 11,152,889 B2 | 10/2021 | Affentranger, Jr. et al. |
| 11,201,457 B1 | 12/2021 | Wiese |
| 11,313,591 B1 | 4/2022 | Atia |
| 11,349,288 B2 | 5/2022 | Yang |
| 11,424,604 B1* | 8/2022 | Mon ....................... H02G 3/081 |
| 11,463,040 B2 | 10/2022 | Affentranger, Jr. |
| 11,486,133 B2 | 11/2022 | Meine |
| 11,486,134 B2 | 11/2022 | Meine |
| 11,515,831 B2 | 11/2022 | Affentranger, Jr. et al. |
| 11,572,690 B2 | 2/2023 | Meine |
| 11,746,820 B2 | 9/2023 | Ash |
| 2002/0066235 A1 | 6/2002 | Stearns et al. |
| 2002/0108315 A1 | 8/2002 | Wasitis et al. |
| 2003/0033780 A1 | 2/2003 | Hasan |
| 2003/0033783 A1 | 2/2003 | Kobetsky |
| 2004/0040243 A1 | 3/2004 | Yaros |
| 2004/0115010 A1 | 6/2004 | Robertson, Jr. et al. |
| 2004/0148688 A1 | 8/2004 | Smith et al. |
| 2004/0148888 A1 | 8/2004 | Kuhn et al. |
| 2004/0170489 A1 | 9/2004 | Nebesnak et al. |
| 2005/0121902 A1 | 6/2005 | Hull et al. |
| 2005/0166503 A1 | 8/2005 | Panasik |
| 2005/0183261 A1 | 8/2005 | Nebesnak et al. |
| 2006/0185289 A1 | 8/2006 | Gong et al. |
| 2007/0137126 A1 | 6/2007 | Sommerhein |
| 2008/0047730 A1 | 2/2008 | Johnson et al. |
| 2008/0178556 A1 | 7/2008 | Meeks |
| 2009/0173028 A1 | 7/2009 | Garrigus et al. |
| 2010/0132305 A1 | 6/2010 | Heckeroth et al. |
| 2010/0326006 A1 | 12/2010 | Yaros |
| 2011/0094652 A1 | 4/2011 | Duvekot et al. |
| 2011/0120047 A1 | 5/2011 | Stearns et al. |
| 2011/0227298 A1 | 9/2011 | Teng |
| 2011/0240088 A1 | 10/2011 | Ecob |
| 2012/0073220 A1 | 3/2012 | Kobayashi et al. |
| 2012/0228863 A1 | 9/2012 | Coleman |
| 2012/0233958 A1 | 9/2012 | Stearns |
| 2012/0234378 A1 | 9/2012 | West et al. |
| 2012/0298817 A1 | 11/2012 | West et al. |
| 2013/0009025 A1 | 1/2013 | Stearns |

(56) References Cited

U.S. PATENT DOCUMENTS

| | | |
|---|---|---|
| 2013/0074441 A1 | 3/2013 | Stearns |
| 2013/0133270 A1 | 5/2013 | West et al. |
| 2013/0276867 A1 | 10/2013 | Wildes et al. |
| 2013/0298494 A1 | 11/2013 | Corsi |
| 2014/0175244 A1 | 6/2014 | West et al. |
| 2014/0331594 A1 | 11/2014 | Stearns et al. |
| 2015/0176434 A1 | 6/2015 | Gerendás et al. |
| 2015/0244308 A1 | 8/2015 | Patton et al. |
| 2015/0270802 A1 | 9/2015 | Schaefer et al. |
| 2016/0134230 A1 | 5/2016 | Meine et al. |
| 2016/0226435 A1 | 8/2016 | Almy et al. |
| 2016/0248367 A1 | 8/2016 | Almy et al. |
| 2016/0248369 A1 | 8/2016 | Almy |
| 2016/0268957 A1 | 9/2016 | Liptak |
| 2016/0268958 A1 | 9/2016 | Wildes et al. |
| 2017/0063300 A1 | 3/2017 | Ash |
| 2017/0108165 A1 | 4/2017 | Svec |
| 2017/0194902 A1 | 7/2017 | Meine et al. |
| 2017/0201207 A1 | 7/2017 | Hudson |
| 2017/0279403 A1 | 9/2017 | Seery et al. |
| 2017/0302222 A1 | 10/2017 | Aliabadi et al. |
| 2018/0062560 A1 | 3/2018 | Stephan et al. |
| 2018/0062571 A1 | 3/2018 | Ash et al. |
| 2019/0093340 A1 | 3/2019 | Meine |
| 2019/0145453 A1 | 5/2019 | Mac Donald et al. |
| 2019/0325370 A1 | 10/2019 | Das |
| 2019/0345971 A1 | 11/2019 | Ash |
| 2020/0378110 A1 | 12/2020 | Meine |
| 2021/0079947 A1 | 3/2021 | Ash |
| 2021/0328415 A1 | 10/2021 | Meine |
| 2022/0352848 A1 | 11/2022 | Meine |
| 2022/0401339 A1 | 12/2022 | Athwal |
| 2023/0128923 A1 | 4/2023 | Meine |
| 2023/0137985 A1 | 5/2023 | Meine |
| 2023/0250629 A1 | 8/2023 | Meine |
| 2023/0358268 A1 | 11/2023 | Ash |

OTHER PUBLICATIONS

Hi-tech Seals Inc, "U-CUPS", retrieved from <https://we.archive.org/web/20200811093253/https://www.hitechseals.com/products/u-cups.asp>, Aug. 11, 2020, 4 pages.

Office Action for U.S. Appl. No. 16/204,334 dated Jan. 31, 2020, Shawn Meine, "Structural Attachment Sealing System", 8 pages.

Office Action for U.S. Appl. No. 16/994,582 dated Dec. 4, 2020, Shawn Meine, "Structural Attachment Sealing System", 14 pages.

Office Action for U.S. Appl. No. 15/875,021 dated Apr. 4, 2018, Shawn Meine, Structural Attachment Sealing System:, 7 pages.

Office Action for U.S. Appl. No. 17/220,730, dated May 13, 2022, Meine, "Structural Attachment Sealing System", 8 pages.

Office Action for U.S. Appl. No. 17/315,215, dated Jun. 2, 2022, Meine, "Structural Attachment Sealing System", 14 pages.

Office Action for U.S. Appl. No. 15/840,430, dated Aug. 14, 2018, Shawn Meine, "Structural Attachment Sealing System", 8 pages.

Office Action for U.S. Appl. No. 17/315,215, dated Sep. 21, 2022, Meine, "Structural Attachment Sealing System", 7 pages.

PCT Search Report and Written Opinion dated Aug. 15, 2022 for PCT Application No. PCT/US22/25710, 8 pages.

Office Action for U.S. Appl. No. 17/977,943, dated Apr. 5, 2023, Inventor #1 Shawn Meine, "Structural Attachment Sealing System," 24 pages.

Office Action for U.S. Appl. No. 17/977,865, dated Mar. 30, 2023, Meine, "Structural Attachment Sealing System", 24 Pages.

Meine, "Panel Mount Assembly," U.S. Appl. No. 29/875,630, filed May 8, 2023, 21 pages.

Office Action for U.S. Appl. No. 17/732,137, dated Jul. 19, 2023, Meine, "Sealable Mounting System With a Slidable Component Mount", 12 Pages.

Office Action for U.S. Appl. No. 18/134,962, dated Nov. 8, 2023, Meine, "Structural Attachment Sealing System", 9 pages.

* cited by examiner

ELECTRIC JUNCTION BOX MOUNT APPARATUS

CROSS REFERENCE TO RELATED PATENT APPLICATION

This application claims the benefit of priority to U.S. Patent Application No. 63/013,234, filed on Apr. 21, 2020, entitled "Electric Junction Box Mount Apparatus," which is incorporated in its entirety by reference.

BACKGROUND

Electrical junction boxes are generally configured to receive, route, and connect electrical cables and/or circuit elements from multiple electrical components. The junction boxes are typically covered or completely closed to minimize interruption and destruction of the components and circuits associated with the electrical cables coupled therein.

Depending on the materials used, a junction box may not be well-suited for use in outdoor environmental conditions. For example, metal junction boxes may rust or deteriorate due to exposure to water and heat. Certain plastics, if used, may suffer similar degradation.

Nevertheless, the known junction boxes that are intended to be used in outdoor environmental conditions still suffer from deficiencies. For example, a junction box to be attached to an exterior surface of a structure for implementation of a solar panel module system may be partially environmentally sealed. However, upon attachment to an exterior surface, moisture from weather conditions may build on and/or around the junction box, thus increasing the risk of moisture damage to the structure.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Overview

This disclosure is directed to a junction box with an integrated sealing system. Embodiments of a junction box disclosed herein may be used on a roof or other surface and are simple, secure, and watertight solutions to allow proper wire connections on the surface, as well as safely penetrate the surface to run conduit through the space behind or beneath the penetrated surface, such as an attic, to a solar inverter or other desired location, device, or connection point.

Embodiments of a junction box disclosed herein may further eliminate the use of a standard flashing necessitated by known products. As described herein, a junction box may be fastened directly over a roof penetration. Once attached, a sealant may be injected through a port into the enclosed cavity around the roof penetration(s). The force from the sealant dispenser gun increases the pressure inside the enclosed cavity forcing air out through a vent opposite the port. This method may allow for sealant to completely fill voids and remove air inside the enclosed cavity around the penetration(s).

Advantages of the embodiments of the junction box disclosed herein include but are not limited to: creation of a permanent airtight and watertight seal; elimination of standard flashings and assemblies, thereby reducing costs; elimination of risks associated with removing nails, as is done with known junction boxes; elimination of the need to cut shingles; and reduction of the overall cost and time to install a system.

Illustrative Embodiments of an Electrical Junction Box

Figure 1:
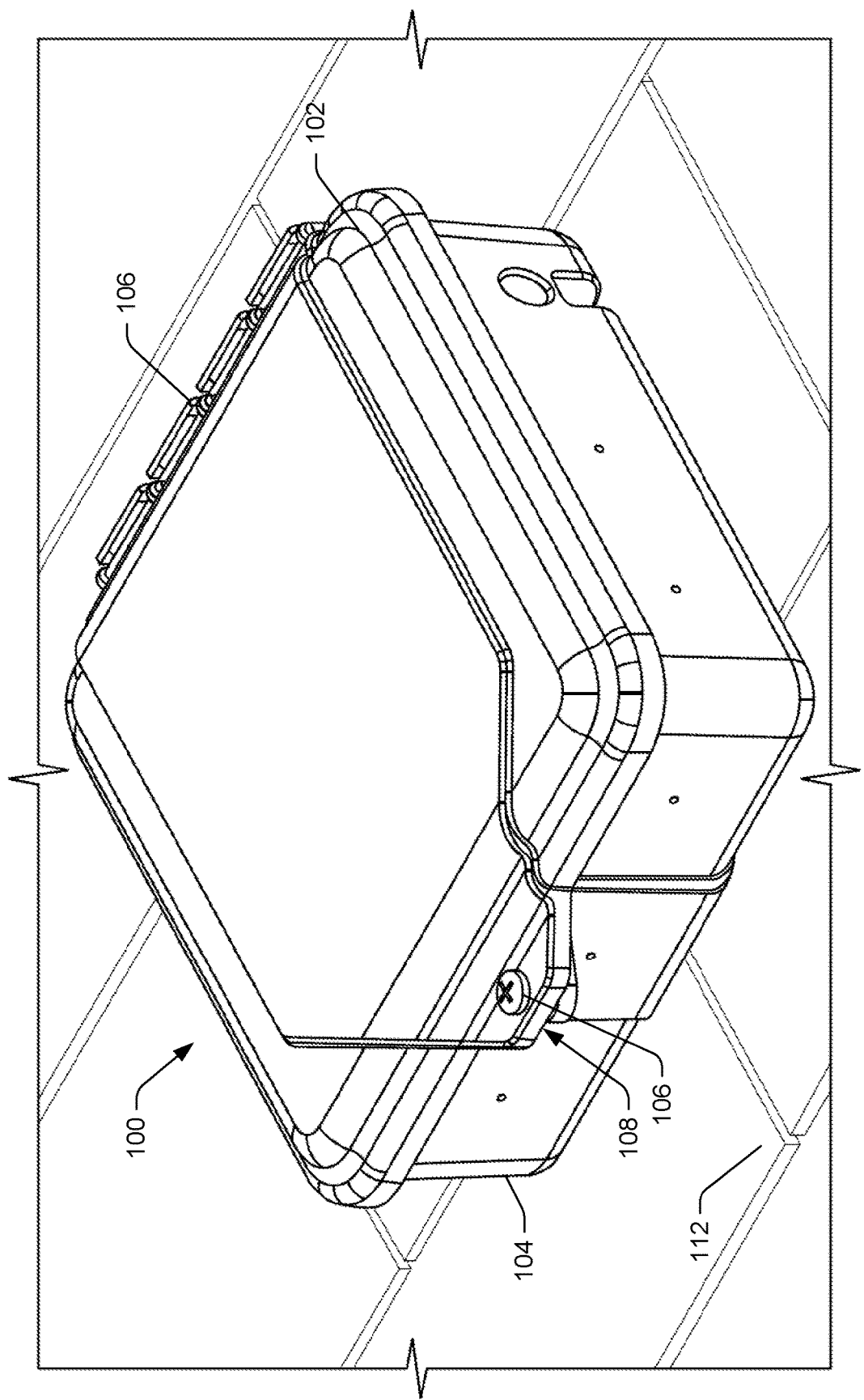
FIG. 1 illustrates a perspective view of an electrical junction box apparatus mounted to a mounting structure according to an embodiment of this disclosure.

Specifically, FIG. 1 illustrates an electrical junction box apparatus 100 ("junction box") including a lid 102 and a base 104 on which the lid 102 is accommodated such that when the lid 102 is placed on the base 104, a sealed box is formed in which electrical components may be secured and maintained in an enclosed environment. When placed on the base 104, the lid 102 may be fastened to the base 104 via a fastener 106 that is configured to pass through a coupling portion 108 of the lid 102. The coupling portion 108 of the lid 102 includes a hole through which the fastener 106 passes to secure the lid 102 to the base 104. Alternatively, the coupling portion 108 may include a latch or other coupling mechanism configured to secure a portion of the lid 102 to the base. In an embodiment, the junction box 100 includes a hinge 110 on an opposite side of the coupling portion 108. The lid 102 may be configured be rotatably move relative to the base 104 via the hinge 110 of the junction box apparatus 100. Furthermore, the lid 102 may be formed from plastic, metal, coated metal, resin, or any other suitable material.

As shown in FIG. 1, the base 104 of the junction box 100 is configured to be mounted to a mounted surface 112, such as a roof, wall, or other mounting structure to which the junction box 100 is secured. As will be shown and described further herein, the base 104 may include one or more holes therein, via which the base 104 is mounted to the mounting structure 112. Furthermore, the base 104 may be formed from plastic, metal, coated metal, resin, or any other suitable material.

Figure 2:
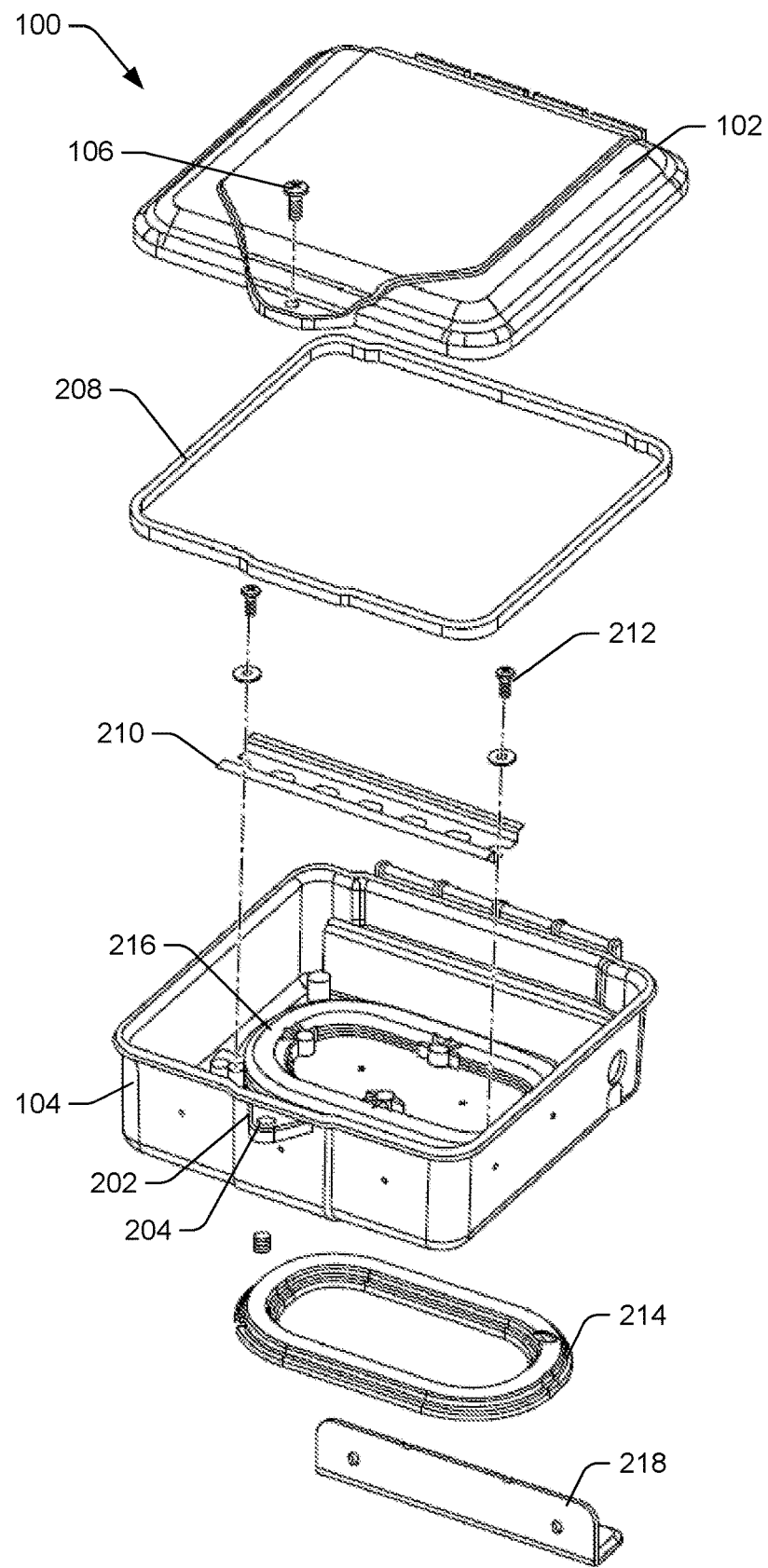
FIG. 2 illustrates an exploded view of various components of the electrical junction box apparatus shown in FIG. 1 according to an embodiment of this disclosure.

FIG. 2 illustrates an exploded view of the junction box 100 shown and described in FIG. 1. As shown in FIG. 2, the base 104 further includes a coupling portion 202 configured to correspond with the coupling portion 108 of the lid 102. For example, the coupling portion 202 of the base 104 may include a hole 204 therein that is positioned to align with a hole in the lid 102 such that the fastener 106 is insertable through a hole in the lid 102 the hole 204 of the base 104.

In an embodiment, the junction box 100 may further include a lid gasket 208 disposed between the lid 102 and the base 104 to assist in providing a secure seal within the junction box 100 when closed. In an embodiment, the lid gasket 208 may be incorporated into or coupled to the lid 102 of the junction box 100. For example, the lid gasket 208 may be coupled (e.g., glued or otherwise adhered) to the lid 102, such that when the lid 102 is closed, the lid gasket 208 may abut a top surface of the base 104, thereby forming a seal between the lid 102 and the base 104. As such, the lid gasket 208 may be shaped such that the lid gasket 208 circumscribes an opening of the base 104. The lid gasket 208 may comprise rubber, fiber, foam, rubber molding compounds, or any other suitable material that provides a secure seal between the lid 102 and the base 104 of the junction box 100.

The junction box 100 may further include a DIN rail 210 mountable within the base 104 of the junction box 100. The DIN rail 210 provides a rail to which circuit breakers and/or other control equipment may be mounted. In an embodiment, the DIN rail 210 is mounted to the base 104 of the junction box via one or more fasteners 212.

The junction box 100 may further include a mounting gasket 214. The mounting gasket 214 of the junction box 100 is configured to correspond with a groove 216 in a bottom side of the base 104. The groove 216 and the mounting gasket 214 may provide an airtight and watertight seal for the base 104 when the base 104 is mounted to the mounting surface 112. The mounting gasket 214 may comprise rubber, fiber, foam, rubber molding compounds, or any other suitable material that provides a secure seal between the base 104 of the junction box 100 and the mounting surface 112 or other secondary structure.

Figure 7:
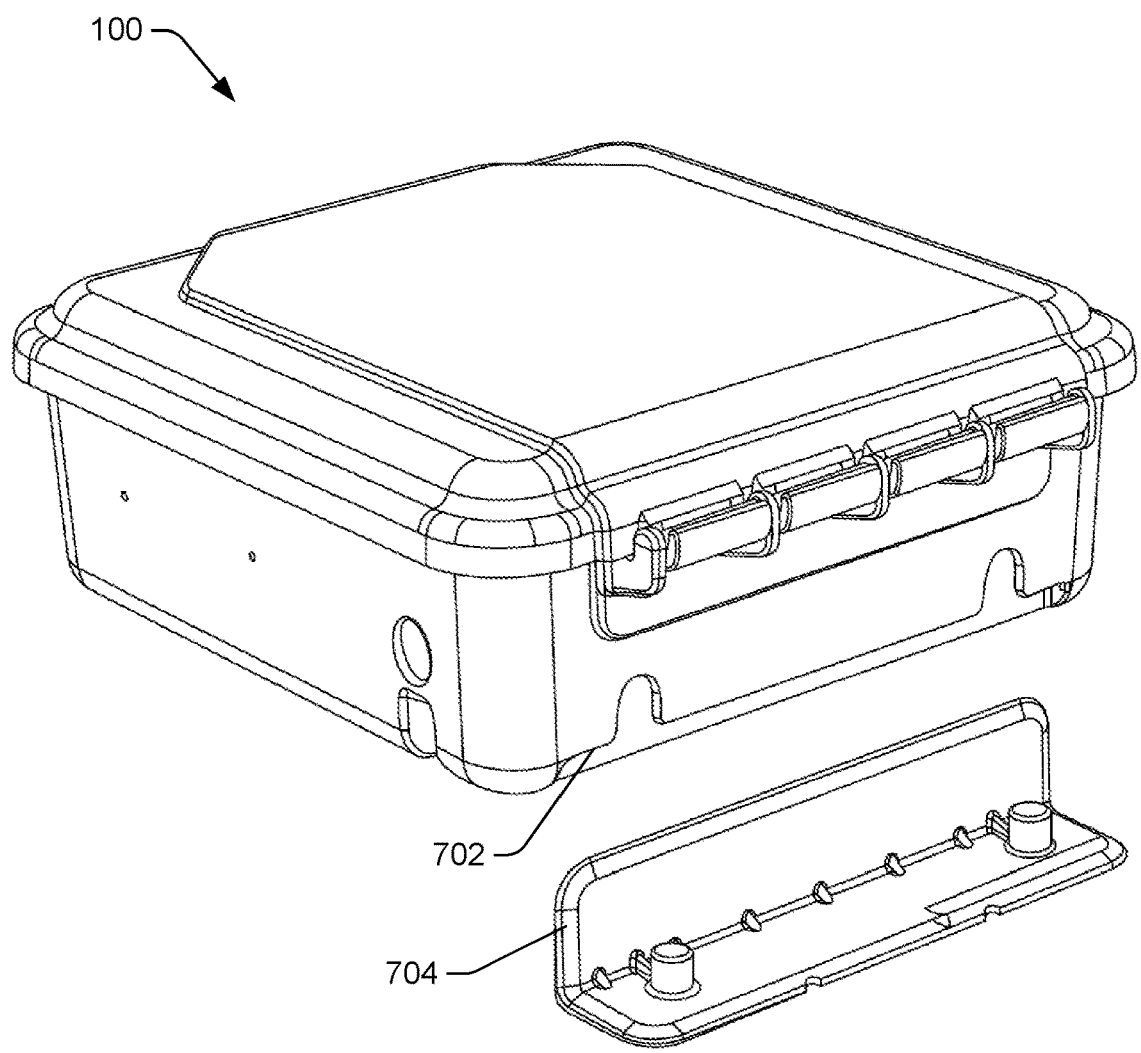
FIG. 7 illustrates a back perspective view of an electrical junction box apparatus shown in FIG. 1 according to an embodiment of this disclosure.

The junction box 100 may further include a deflector 218 that is sized to be insertable in a slot of the junction box 100 (shown and described further herein with respect to FIG. 7). The deflector 218 may be configured to be coupled to a secondary structure such as the mounting structure 112 or other secondary structure, such as a rail or other type of secondary structure. The deflector 218 may include an elongated L-shaped bracket, such that one extension of the L-shaped bracket is slidably accommodated within the slot of the junction box 100.

Figure 3:
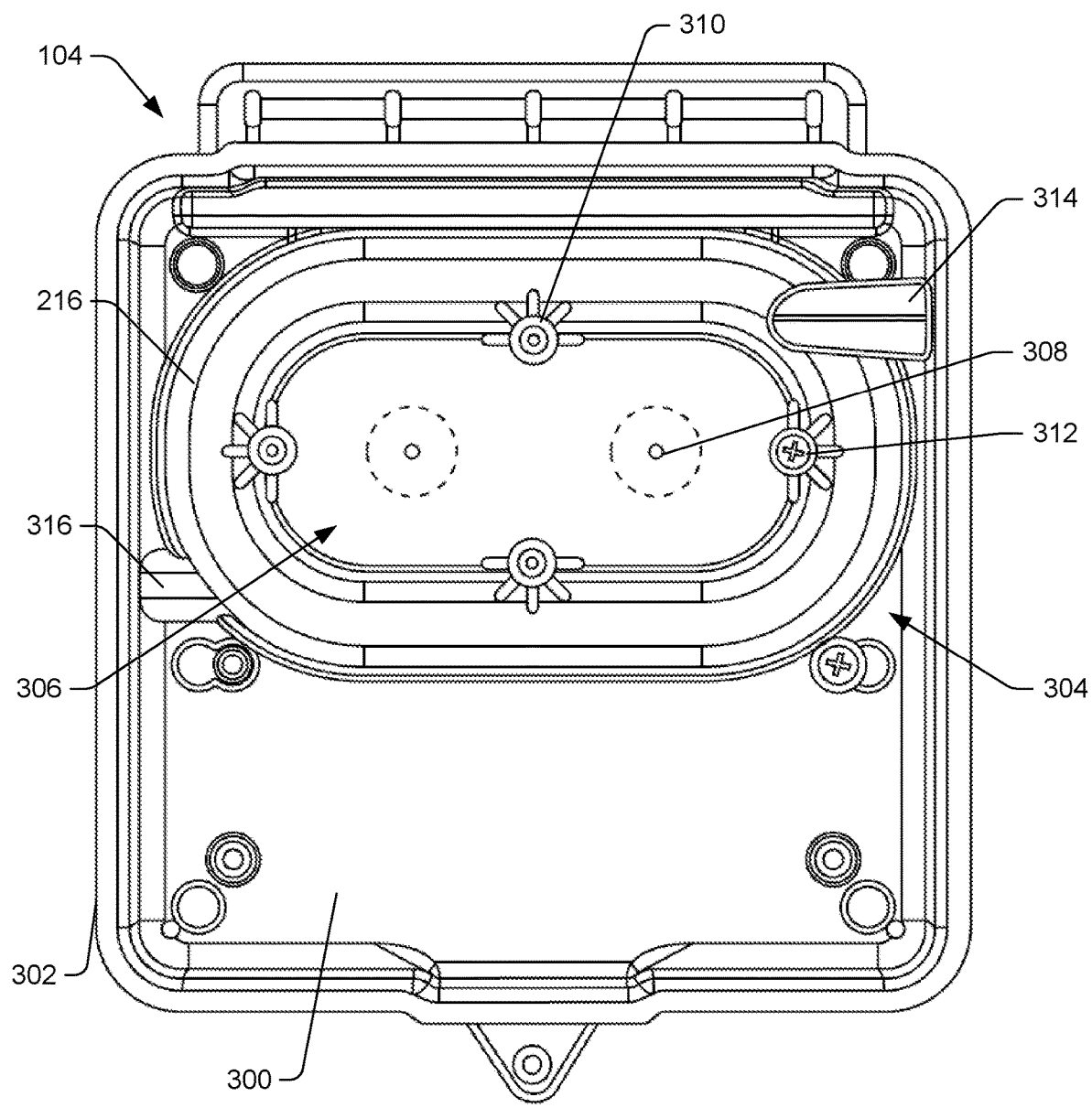
FIG. 3 illustrates a plane view of a base of the electrical junction box apparatus shown in FIG. 1 according to an embodiment of this disclosure.

FIG. 3 illustrates a plane view of the base 104 of the junction box 100. As seen in FIG. 3, a structure of the base 104 may include a bottom panel 300 and one or more side panels 302 to form a variety of shapes, as desired, e.g., a single side panel forming a cylindrical box, three side panels forming a triangular box, four side panels forming a cuboidal or parallelepiped box, etc. In an embodiment, the one or more side panels 302 and the bottom panel 300 may be integrally formed as a unitary body.

A panel, such as the bottom panel 300 for example, of the base 104 includes a mounting portion 304 via which the junction box 100 may be mounted to a surface, such as the mounting surface 112 or other secondary structure. The mounting portion 304 of the base 104 includes a penetration area 306 having one or more guide holes 308 (or divots). The one or more holes 308 provide a guide for one or more holes to be drilled in order to install a conduit hub fitting or other fitting to allow conduit to be inserted into the base 104 of the junction box 100. In an embodiment, the holes 308 in the penetration area 306 may be enlarged to a larger size (represented by the dotted circles in FIG. 3, which are merely shown for reference) using a drill bit in order to allow conduit, fasteners or other components to pass therethrough. In an embodiment, the holes 308 may be pre-punched and/or predrilled. Additionally, and/or alternatively, the holes 308 may instead be divots for a drill point to begin drilling mounting holes for screws and/or wiring holes for cable passage. Nevertheless, the installer may make one or more holes 308 according to the specific installation. That is, the exact location and/or size of the one or more holes 308 in the bottom panel 300 aligns with a position at which electrical cables may be routed from the space beneath or behind the mounting surface 112 to which the junction box 100 is to be secured, as well as the relative location of a structural feature of the surface to which the screws may be secured, e.g., a stud or other support member of the mounting surface 112, or the surface structure to which screws may be secured effectively.

In an embodiment, the junction box 100 further includes one or more mounting holes 310 through which one or more fasteners 312 may be inserted to mount the base 104 to the mounting surface 112 or other secondary structure. As shown in FIG. 3, the mounting holes 310 may be located within the groove 216 and/or the mounting gasket 214 such that the mounting holes 310 are located within the seal created by the groove 216 and/or the mounting gasket 214.

Furthermore, a periphery of the penetration area 306 in the mounting portion 304 may be circumscribed via a groove 216 formed into an outer surface of the bottom panel 200. On the inside of the base 104, in an embodiment, the relative location of the groove 216 may appear as a looped protrusion, raised from a substantially planar inner surface of the bottom panel 200, thereby clearly indicating the penetration area 206 in which the holes are to be located, which is within the looped protrusion. Nevertheless, in such an alternative embodiment, the bottom panel 300 may have added markings or other visual indicators to inform an installer of the penetration area 306.

Upon placing the base 104 against the mounting surface, the empty space within the groove 216 becomes substantially enclosed between the outer surface of the bottom panel 200 (or the gasket therein) and the mounting surface 112. Once secured to the mounting surface 112 with fasteners 312, the empty space within the groove 216 (which is further within the mounting gasket 214, if so equipped) may be filled with a sealant via an injection port 314 disposed in connection with the groove 216. An injection port 314 may be located at a position to intersect the groove 216 from above the mounting surface 112 such that the injection port 314 is fluid connected to the groove 216. For example, in an embodiment shown in FIGS. 1-3, an injection port 314 may include a sealant delivery entry hole (see FIGS. 1 and 2) located at an outer side surface of the base 104 and a tunneled or tubular pathway (see FIG. 3, top down, outer view) that opens in the empty space. Moreover, a portion of an injection port 314 is depicted, and is described in more detail further herein. However, according to design preferences/needs, structural features/needs, and/or manufacturing techniques/capabilities, in an alternative embodiment, the location of the groove 216 may be visibly obscured from the inside of the base 104 by the structure thereof. It is to be noted that the junction box 100 may omit the mounting gasket 214 and a sealant may be injected into the groove 216 of the base 104 to form a watertight and/or air tight seal between the base 104 and the mounting surface 112.

Furthermore, the base 104 may include a vent port 316 located at a position to intersect the groove 216. The vent port 316 may be located in connection with the groove 216 and, if so equipped, aligned with a gap (shown and described with respect to FIG. 4) in the mounting gasket 214. The vent port is configured to vent air being pushed out of the enclosed space within the groove 216 as sealant is injected therein. In an embodiment, the vent portion 316 may be disposed at a portion of the groove 216 that is opposite the injection port 314 with respect to a shape of the groove 216. However, the vent portion 316 may be disposed at any portion of the groove 216.

Figure 4:
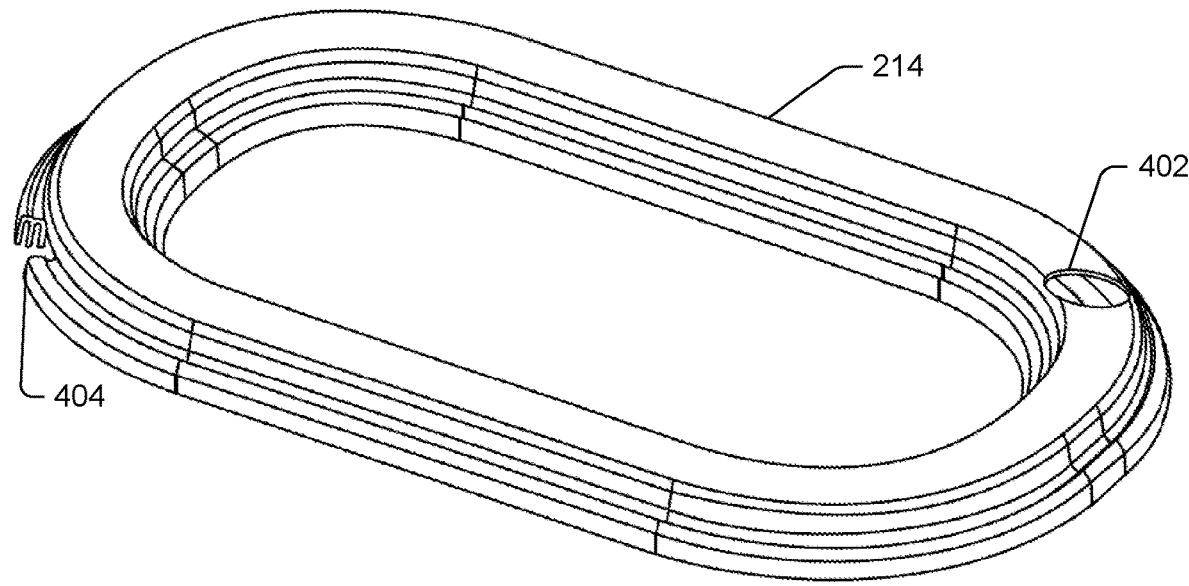
FIG. 4 illustrates a perspective view of a mounting gasket of the electrical junction box apparatus shown in FIG. 1 according to an embodiment of this disclosure.

FIG. 4 illustrates the mounting gasket 214 of the junction box 100. As shown in FIG. 4, the mounting gasket 214 includes a hole 402 therein. A size and location of the hole 402 in the mounting gasket 214 is configured to correspond with the injection port 314 of the base 104, shown and described previously. As such, the hole 402 in the mounting gasket 214 allows sealant to be injected into an empty space formed within the mounting gasket 214 when the base 104 is mounted to the mounting surface 112. The mounting gasket 214 further includes a gap 404 therein. The size and location of the gap 404 in the mounting gasket 214 is configured to correspond with the vent portion 316 of the base 104, shown and described previously. As such, the gap 404 in the mounting gasket 214 allows sealant to vent out of the gap 404 in the mounting gasket 214 when sealant is injected into the mounting gasket 214.

Figure 5:
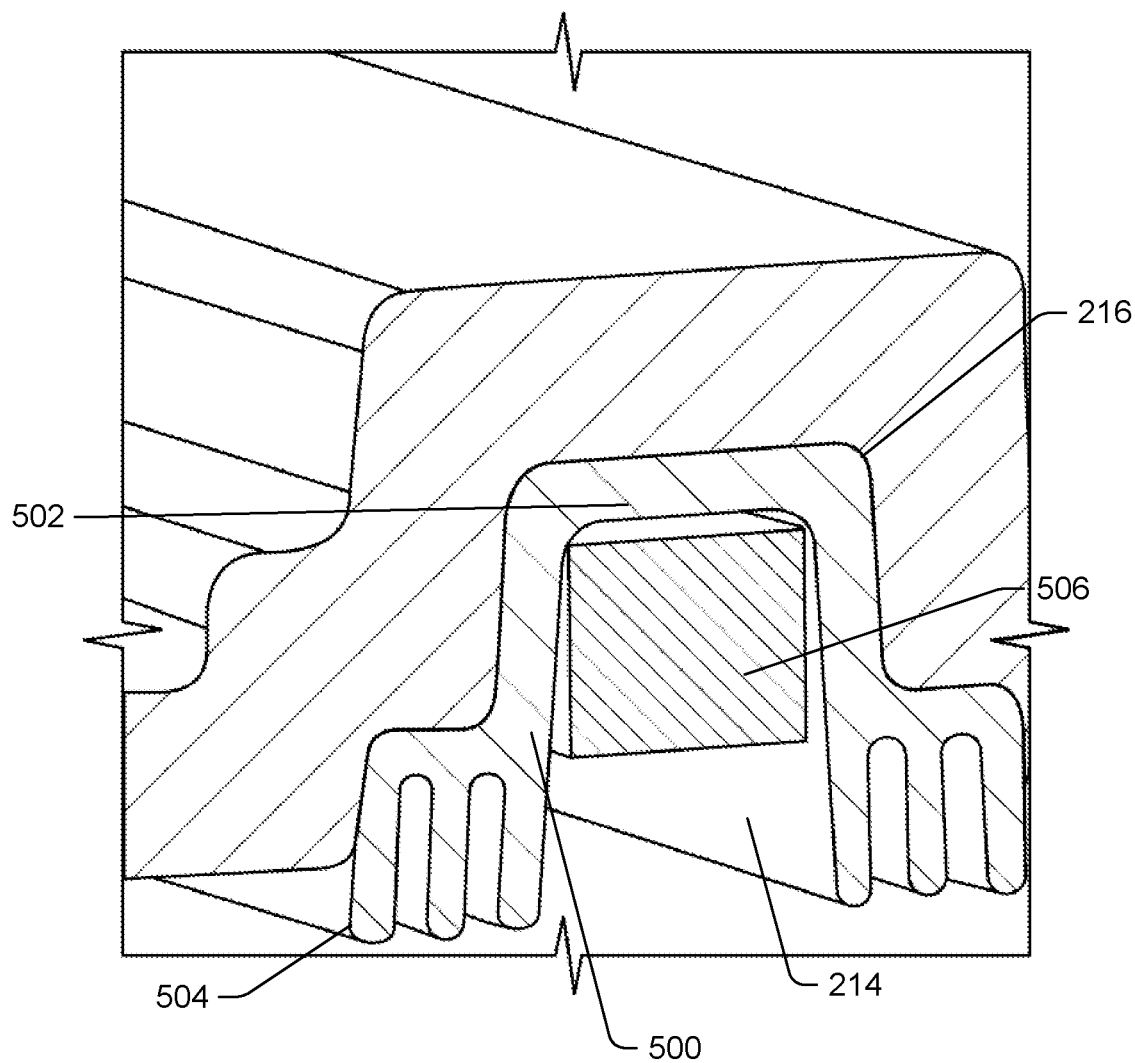
FIG. 5 illustrates a cross-sectional view of the mounting gasket of the electrical junction box apparatus shown in FIG. 1 according to an embodiment of this disclosure.

FIG. 5 illustrates a cross-sectional view of the mounting gasket 214 of the junction box 100. As mentioned previously, the mounting portion 304 of the junction box 100 includes the mounting gasket 214 correspondingly shaped to be seated in the groove 216. The mounting gasket 214 does not fill an entirety of the volume of the groove 216. Rather, the mounting gasket 214 is sized to be disposed within the groove 216, for example, against a wall of the groove 216, while maintaining an empty space surrounding the penetration area 306 of the mounting portion 304.

In an embodiment, as shown in the cross section in FIG. 3, the mounting gasket 214 may have a general "U" shape including open-ended arms 500 connected by a common bottom portion 502. The U-shaped mounting gasket 214 may conform in shape and size with a shape and size of the groove 216 such that the bottom portion of the mounting gasket 214 rests within the groove 216 so that the arms extend outward from lateral sides of the groove 216. Further, each of the arms 500 of the mounting gasket 214 may include one or more flexible flange members 504 to compress against the mounting surface and provide additional sealing protection from moisture and debris. In an embodiment, one or both of the arms 500 may include at least two flange members 504 that extend as adjacent and substantially parallel branches from the arms 500. Moreover, the flange members 504 may extend, when bent, in a direction transverse to the direction of extension of the arms 500 so as to be inclined to folding and sealing against the mounting surface. That is, when the base 104 is mounted to the mounting surface, the flange members 504 may compress and/or flex.

Upon placing the base 104 including the mounting gasket 214 against the mounting surface 112, the empty space within the mounting gasket 214 becomes substantially enclosed between the bottom portion 502 of the mounting gasket 214 and the mounting surface 112. Once secured to the mounting surface 112 with fasteners, the empty space within the mounting gasket 214 may be filled with a sealant 506 via the injection port 314 disposed in connection with the groove 216. In an embodiment, the sealant 506 may include any type of sealant, insulation, or any other suitable material configured to form a watertight and/or airtight seal between the mounting gasket 214 and the mounting surface 112. The sealant 506 may comprise any type of suitable sealant material including acrylic, polyurethane, silicone, rubber, etc.

Figure 6:
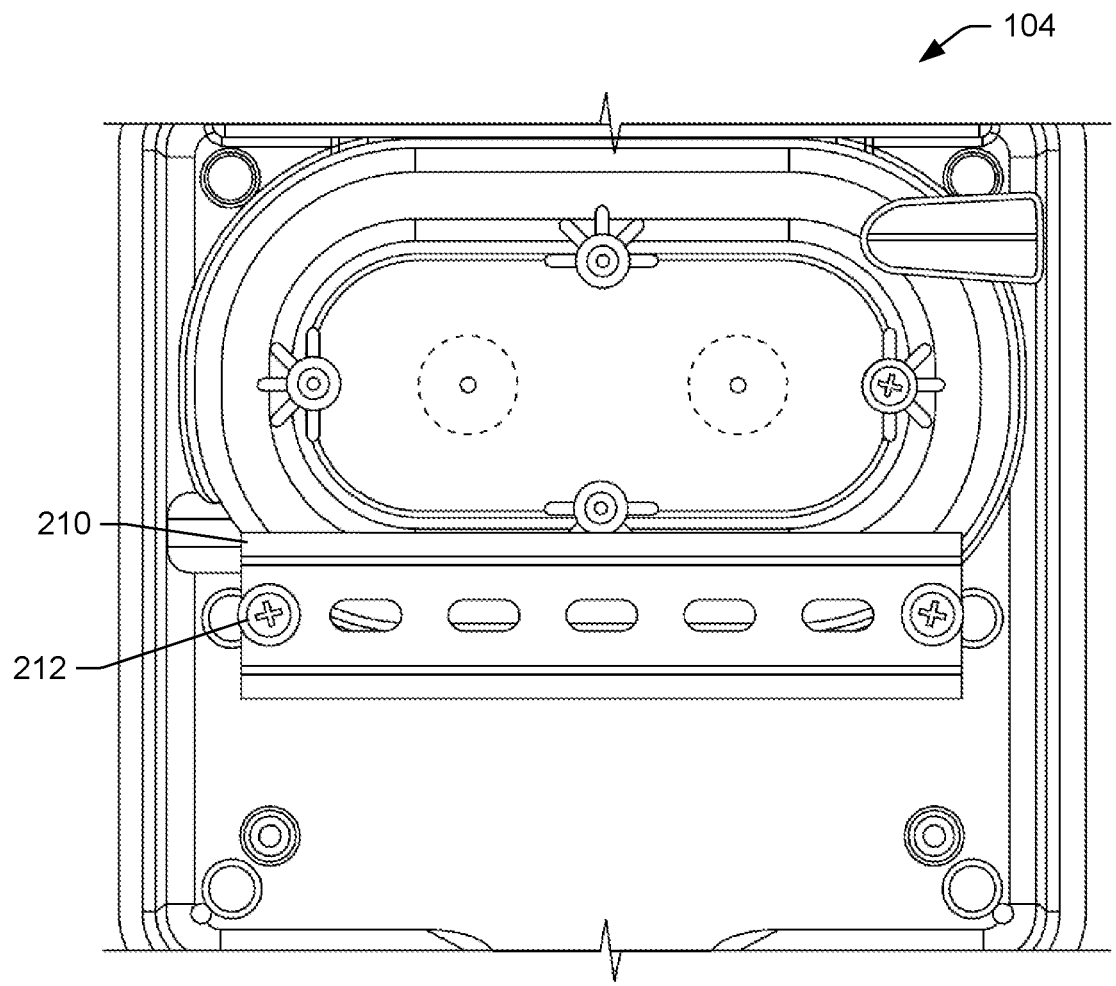
FIG. 6 illustrates a plane view of a base of the electrical junction box apparatus shown in FIG. 1 according to an embodiment of this disclosure.

FIG. 6 illustrates a plane view of the base 104 of the junction box 100 having a DIN rail 210 mounted thereto. As mentioned previously, the DIN rail 210 provides a rail to which circuit breakers and/or other control equipment may be mounted. In an embodiment, the DIN rail 210 is mounted to the base 104 of the junction box via one or more fasteners 212.

FIG. 7 illustrates a back perspective view of the junction box 100 and the deflector 218. As mentioned previously, the deflector 218 is shaped to be insertable into a slot 702 in the junction box 100. In an embodiment, the slot 702 is formed within at least one of the side panels 302 of the base 104. The deflector 218 may be configured to be coupled to the mounting structure 112 or other secondary structure, such as a rail or other type of secondary structure. In an embodiment where the mounting structure 112 includes a roof having shingles, at least a portion of the deflector 218 may be inserted under a shingle and coupled to the mounting structure 112 via fastener and/or an adhesive. The deflector 218 includes an elongated L-shaped bracket and one extension 704 of the L-shaped bracket is slidably accommodated within the slot 702 of the junction box 100.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. An electrical junction box mount apparatus comprising:
    a base for mounting to a mounting surface; and
    a lid sized to seal against the base,
    wherein the base includes a mounting portion having a penetration area,
    wherein a periphery of the penetration area is circumscribed via a groove formed into a bottom surface of the base such that upon placing the base on the mounting surface, the groove encloses empty space within the groove against the mounting surface, and
    wherein a perimeter of the groove defines a first area that is less than a second area defined by an outer perimeter of the base.

2. The electrical junction box mount apparatus of claim 1, further comprising a seal seated within the groove.

3. The electrical junction box mount apparatus of claim 2, wherein the seal comprises a gasket sized to be disposed within the groove.

4. The electrical junction box mount apparatus of claim 2, wherein the seal includes open-ended arms connected by a bottom portion of the seal, such that a profile of the seal substantially forms a "U" shape.

5. The electrical junction box mount apparatus of claim 2, wherein the seal includes one or more flexible flange members that compress against the mounting surface.

6. The electrical junction box mount apparatus of claim 1, further comprising an injection port disposed in connection with the groove, the injection port being configured to receive a sealant via injection and permit passage of the sealant into the empty space to fill the empty space.

7. The electrical junction box mount apparatus of claim 1, further comprising a rail attachment slot.

8. The electrical junction box mount apparatus of claim 1, wherein the penetration area includes one or more holes therein through which one or more wires or one or more fasteners are inserted.

9. The electrical junction box mount apparatus of claim 1, further comprising a gasket disposed between the lid and the base.

10. A junction box comprising:
   a base configured to be mounted to a mounting surface, the base including:
      a mounting portion having a penetration area, and
      a groove circumscribing the penetration area and formed into a bottom surface of the base, wherein a first perimeter of the groove defines a first area that is less than a second area defined by a second perimeter of the base; and
   a gasket correspondingly shaped to be seated within the groove such that upon placing the base on the mounting surface, the gasket encloses empty space within the gasket against the mounting surface.

11. The junction box of claim 10, wherein the groove includes an injection port disposed in connection with the groove such that the injection port is fluidly connected with the groove.

12. The junction box of claim 11, wherein the gasket includes a hole therein configured to correspond with the injection port, thereby fluidly connecting the gasket with the injection port.

13. The junction box of claim 10, wherein sealant is injected into the empty space within the gasket between the gasket and the mounting surface.

14. The junction box of claim 10, wherein the gasket includes open-ended arms connected by a bottom portion of the gasket.

15. The junction box of claim 10, wherein the groove includes a vent port disposed in connection with the groove, the vent port being configured to allow sealant to displace air within the empty space when sealant is injected into the empty space.

16. An electrical junction box comprising:
   a base including a mounting portion having a penetration area circumscribed via a groove formed into a bottom surface of the base, a first perimeter of the groove defining a first area that is less than a second area defined by a second perimeter of the base;
   a lid sized to correspond with the base; and
   a gasket inserted at least partially into the groove such that upon mounting the electrical junction box to a mounting surface, the gasket encloses an empty space within the gasket against the mounting surface.

17. The electrical junction box of claim 16, further comprising:
   a slot formed within a side panel of the base; and
   an L-shaped deflector configured to be slidably accommodated within the slot.

18. The electrical junction box of claim 16, wherein the gasket includes open-ended arms connected by a bottom portion of the gasket.

19. The electrical junction box of claim 16, wherein the penetration area includes one or more holes therein through which one or more wires or conduit are inserted.

20. The electrical junction box of claim 16, further comprising sealant injected into the empty space within the gasket.

* * * * *